US007668120B2

(12) United States Patent  
Kolar

(10) Patent No.: US 7,668,120 B2  
(45) Date of Patent: Feb. 23, 2010

(54) VIRTUAL IP-BASED A/V INPUTS FOR UNIVERSAL MEDIA SERVERS

(75) Inventor: Mark A. Kolar, Highlands Ranch, CO (US)

(73) Assignee: Cisco Technology, Inc., San Jose, CA (US)

( * ) Notice: Subject to any disclaimer, the term of this patent is extended or adjusted under 35 U.S.C. 154(b) by 360 days.

(21) Appl. No.: 11/671,805

(22) Filed: Feb. 6, 2007

(65) Prior Publication Data

US 2008/0186979 A1    Aug. 7, 2008

(51) Int. Cl.  
*H04L 12/16* (2006.01)

(52) U.S. Cl. .................. 370/260; 370/392; 370/400; 725/114

(58) Field of Classification Search .............. None  
See application file for complete search history.

(56) References Cited

U.S. PATENT DOCUMENTS

| | | | |
|---|---|---|---|
| 6,181,711 B1 | 1/2001 | Zhang et al. | |
| 6,345,294 B1 | 2/2002 | O'Toole et al. | |
| 6,373,838 B1 | 4/2002 | Law et al. | |
| 6,445,697 B1 | 9/2002 | Fenton | |
| 6,611,531 B1 | 8/2003 | Chen et al. | |
| 6,738,803 B1 | 5/2004 | Dodrill et al. | |
| 6,766,298 B1 | 7/2004 | Dodrill et al. | |
| 6,952,800 B1 | 10/2005 | Danner et al. | |
| 6,989,856 B2 | 1/2006 | Firestone et al. | |
| 7,346,917 B2 * | 3/2008 | Gatto et al. | 725/5 |
| 2003/0227540 A1 * | 12/2003 | Monroe | 348/14.02 |
| 2005/0004977 A1 | 1/2005 | Roberts et al. | |
| 2007/0180485 A1 * | 8/2007 | Dua | 725/114 |

* cited by examiner

*Primary Examiner*—Jayanti K Patel  
*Assistant Examiner*—Jung Park  
(74) *Attorney, Agent, or Firm*—Cesari and McKenna, LLP

(57) ABSTRACT

In one embodiment, a universal media server (e.g., a set-top box) has zero or more physical audio and/or video (A/V) inputs configured to receive A/V data, and at least one Internet Protocol (IP) input configured to receive IP data. In particular, the universal media server has one or more virtual A/V inputs, each virtual A/V input corresponding to an IP-based A/V source device having a corresponding IP source address and configured to receive IP-based A/V data from the IP-based A/V source device on the at least one IP input. The universal media server also has at least one A/V output configured to selectively output A/V data according to a selected input of the physical and virtual inputs.

25 Claims, 8 Drawing Sheets

| VIRTUAL INPUT ID 305 | IP ADDRESS / URL (E.G., CORRESPONDING TO:) |
|---|---|
| 4 "FRONT" | (FRONT DOOR) |
| 5 "BACK" | (BACK DOOR) |
| 6 "MOM" | (MOM'S VIDEO CONFERENCING) |
| 7 "TRAFFIC 1" | (TRAFFIC VIDEO OF FIRST ROUTE) |
| 8 "TRAFFIC 2" | (TRAFFIC VIDEO OF SECOND ROUTE) |
| 9 "AUDIO" | (INTERNET RADIO STATION) |
| ... | ... |
| N UNUSED | (FOR FUTURE CONFIGURATION) |

VIRTUAL INPUT LIST 300

ENTRIES 320

FIG. 3

VIRTUAL IP-BASED A/V INPUTS FOR UNIVERSAL MEDIA SERVERS

TECHNICAL FIELD

The present disclosure relates generally to computer networks, and, more particularly, to Internet Protocol (IP)-based audio and/or video (A/V) inputs for universal media servers (e.g., set-top boxes).

BACKGROUND

Generally, in the field of audio and/or video (A/V) media, there is a divide between conventional analog/digital media and Internet Protocol (IP)-based media. For instance, conventional A/V media has commonly been used for televisions (TVs), set-top boxes, etc., such as through various cable/satellite provider networks. However, it is somewhat difficult/complex to manage conventional (analog/digital) video so that it may be viewed by IP-based receivers, such as Personal Computers (PCs). Conversely, IP-based media is becoming more prevalent, such as with the transmission of music and videos directly over a computer network to a PC (or other IP-based devices), but again, it may be difficult to manage the IP-media so that it may be viewed/heard on non-IP-based output devices such as TVs, etc.

The divide described above is particularly noticeable in the area of video surveillance. For example, more and more homeowners and homebuilders are deploying security cameras into the home for enhanced security applications. These enhanced security applications may be used to provide access to live and recorded security video, both while in the home (locally) and away from the home (remotely). In one solution, analog cameras and radio frequency (RF) converters may be used to deliver the video to TVs for in-house viewing (e.g., on "channels" not used by other broadcasts). However, such a solution may be difficult for the average consumer to set up, and is generally not accessible remotely, e.g., only viewable from the TVs in the house. More advanced users, on the other hand, can readily purchase a range of wired and wireless IP cameras and then view the IP-based video from an IP-based receiver device, such as a PC having special surveillance software (or with access to a registration site receiving video signals from the IP-based cameras). While various PC-based software applications may be used to encode analog video and record it to local hard drives inside the PC, such solutions may be expensive and beyond the skill of the average consumer (and generally limited to in-home video surveillance). Further, neither PC-based solution leverages the TV, a device located in nearly every consumer's home, and a device which is far more easily operated for the average consumer than a PC (particularly the complex arrangements required for video surveillance described above).

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 illustrates an example virtual input list;

DESCRIPTION OF EXAMPLE EMBODIMENTS

Overview

According to embodiments of the disclosure, a universal media server (e.g., a set-top box) has zero or more physical audio and/or video (A/V) inputs configured to receive A/V data, and at least one Internet Protocol (IP) input configured to receive IP data. In particular, the universal media server has one or more virtual A/V inputs, each virtual A/V input corresponding to an IP-based A/V source device having a corresponding IP source address and configured to receive IP-based A/V data from the IP-based A/V source device on the at least one IP input. The universal media server also has at least one A/V output configured to selectively output A/V data according to a selected input of the physical and virtual inputs.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus, or illustratively, a home. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various net-works. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
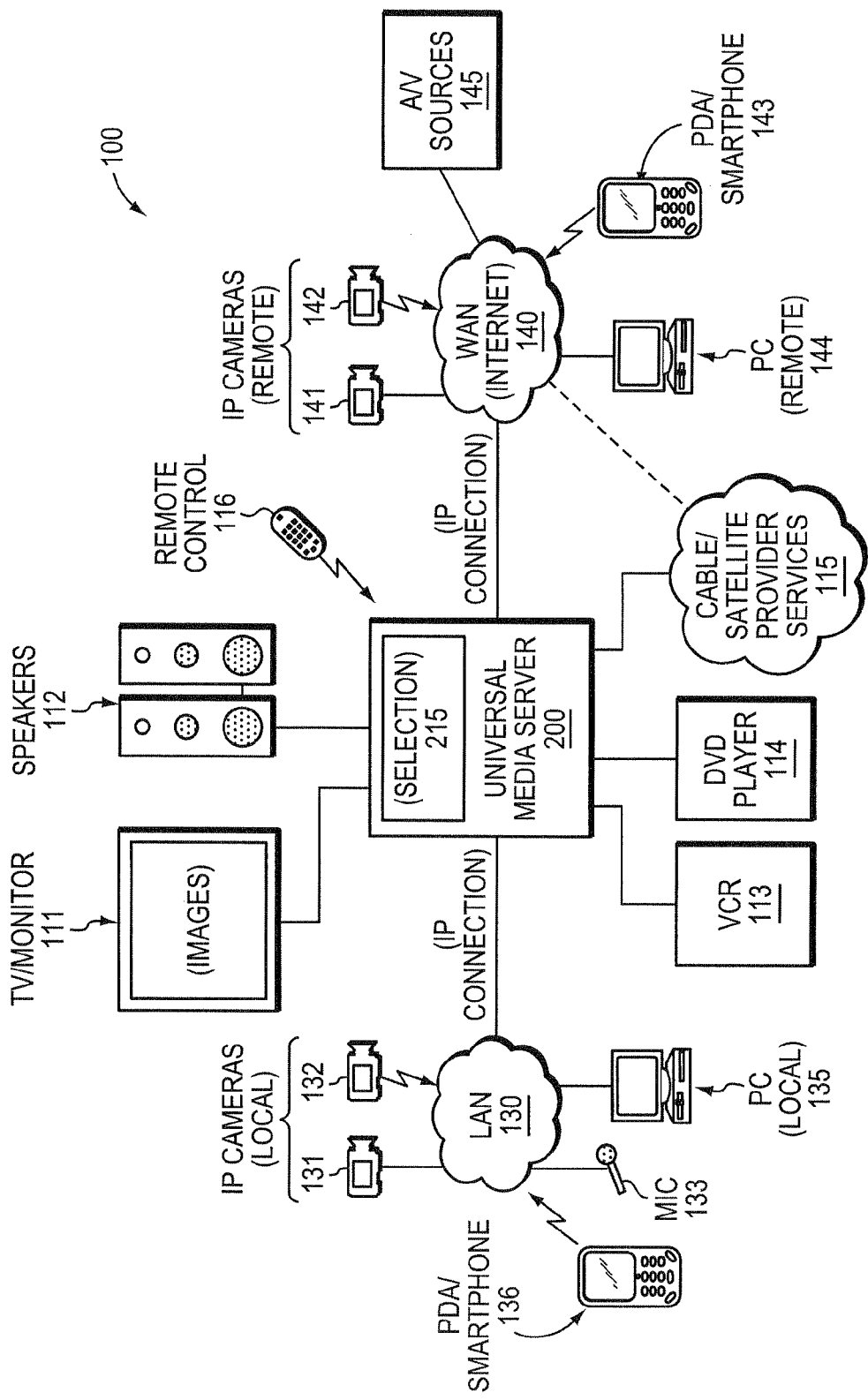
FIG. 1 illustrates an example network.

FIG. 1 is a schematic block diagram of an example network 100 illustratively comprising nodes/devices, in accordance with one or more embodiments described herein. For instance, a television (TV)/monitor 111 and one or more speakers 112 may be interconnected to a universal media server (UMS) 200, such as a "set-top box" as will be understood by those skilled in the art. For example, a set-top box may be a converter box used by air (antenna), video digital subscriber line (DSL), cable, and/or satellite service providers to convert proprietary signals (from provider services 115, which, notably, may originate from WAN 140, as shown by the dashed line) into audio and/or video (A/V) outputs for UMS users, e.g., images for the TV. A UMS 200 may also be used to connect other peripheral devices, such as a video cassette recorder (VCR) 113 (magnetic media), digital video/versatile disc (DVD) player 114 (optical media), etc., and may receive commands from a remote control 116. Notably, while the UMS is illustratively shown as a set-top box as understood by those skilled in the art, the UMS may also act as a media receiver, such as various video switching devices (A/V receivers).

In addition, in accordance with one or more embodiments described herein, the UMS 200 may be connected to an IP-based LAN 130, such as a LAN within a home or building, e.g., because the UMS is often the access (residential) gateway/router/modem (to WAN 140). Interconnected to the LAN 130 may be one or more IP-based cameras, e.g., hard-wired cameras 131 and/or wireless cameras 132, as well as other various A/V input devices, such as microphones, audio players (e.g., MP3 players), or radio tuners 133, etc. One or more personal computers (PCs) 135 (wired/wireless desktops/laptops, etc.) and/or one or more personal digital assistants (PDAs) or "smartphones" 136 may also be interconnected with the LAN 130.

As noted, LAN 130 is often connected (e.g., via UMS 200) to a WAN 140 (e.g., the Internet), which may be used to communicate with nodes/devices outside of the LAN, e.g., outside of the house. The nodes/devices interconnected with WAN 140 may comprise additional IP-based A/V input devices (e.g., cameras 141 and 142), or other A/V sources 145 (e.g., IP-based A/V servers, broadcasters, etc.). Various input/output (I/O) devices may also communicate with the WAN 140, such as one or more PCs 144, one or more PDAs or smartphones 143, etc. Notably, each device interconnected with the WAN 140 may first traverse a local LAN or other network (e.g., a cellular network for smart-phones 143) prior to connection with the WAN, and such LANs are not shown for clarity.

Those skilled in the art will understand that any number of nodes, devices, links, etc. may be used in the network 100, and that the view shown herein is for simplicity. For example, various IP-based A/V inputs are shown interconnected with LANs/WANs, however, various converters may be used to allow the IP-based communication. Those skilled in the art will also understand that while the embodiments described herein are described in terms of example network configurations involving particular connections, many other configurations are possible for network 100, and that each configuration may be within the scope and spirit of the embodiments described herein.

Further, data packets (e.g., IP-based traffic) may be exchanged among the IP-based nodes/devices of the network 100 using predefined network communication protocols such as TCP/IP, User Datagram Protocol (UDP), Asynchronous Transfer Mode (ATM) protocol, Frame Relay protocol, Internet Packet Exchange (IPX) protocol, etc. As used herein, while the term "IP-based" may be used to denote an IP-based network communication protocol, the present disclosure may also be used with other computer network communication protocols as will be appreciated by those skilled in the art.

Figure 2:
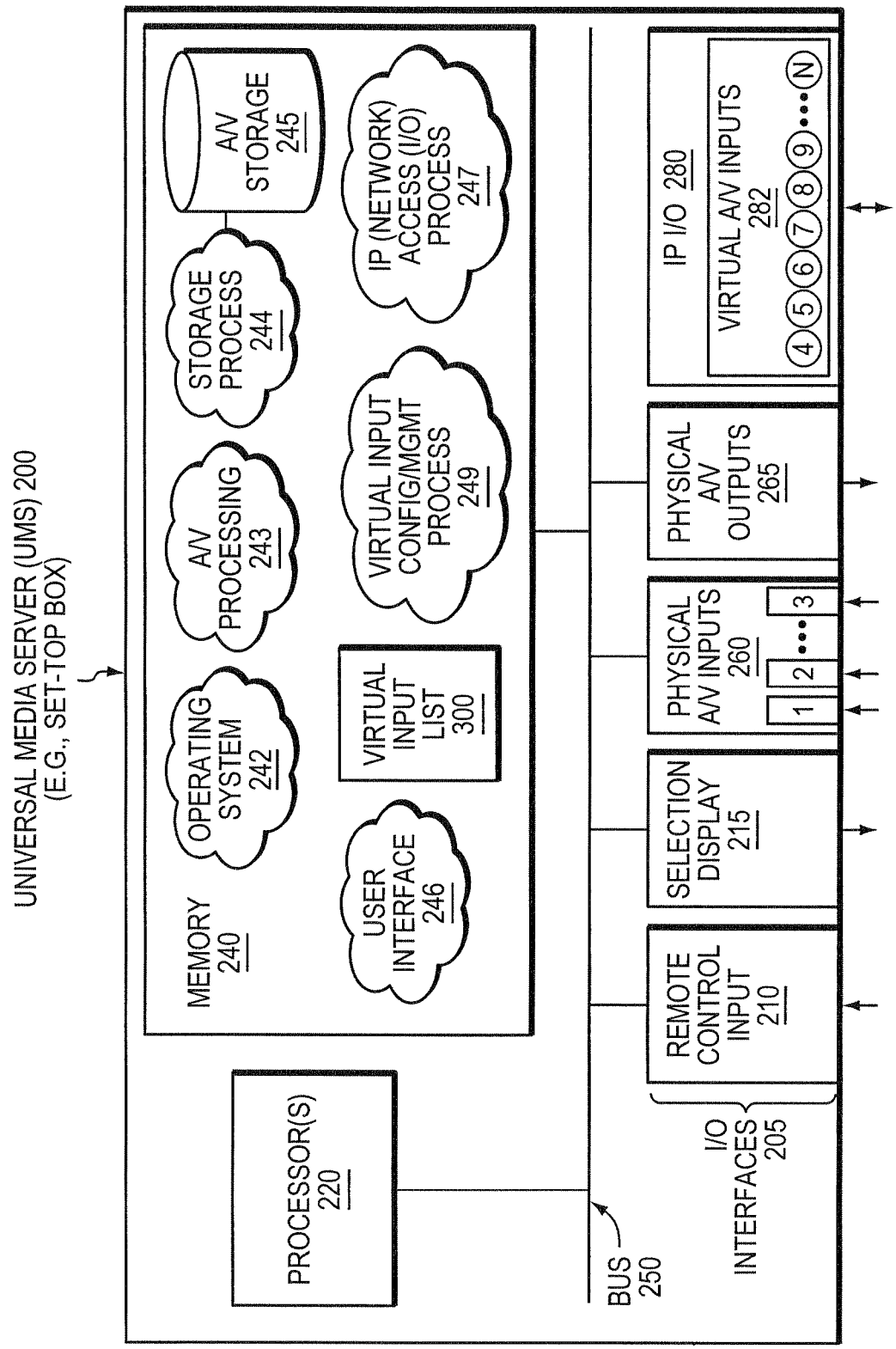
FIG. 2 illustrates an example universal media server (UMS)

FIG. 2 is a schematic block diagram of an example universal media server (UMS) 200 that may be advantageously used with one or more embodiments described herein (e.g., a set-top box). The UMS 200 may comprise a plurality of I/O interfaces 205, one or more processors 220, and a memory 240 interconnected by a system bus 250. The I/O interfaces 205 contain the mechanical, electrical, and signaling circuitry for communicating data over wired/wireless links coupled to the network 100. For example, illustrative I/O interfaces 205 may comprise a remote control input 210 (e.g., infrared receivers for remote control 116) and a selection display 215 (e.g., a liquid crystal display, or "LCD" on the exterior of the UMS) to display various system information of the UMS as will be understood by those skilled in the art, such as, e.g., an input/channel/menu selection, etc. In addition, example illustrative I/O interfaces may comprise physical A/V inputs 260 (e.g., 260.1, 260.2, and 260.3) and outputs 265 (e.g., one or more, not specifically shown), as well as an IP (network) I/O interface 280. Physical A/V inputs 260 may be configured to receive various A/V communication protocols with appropriate physical connections, such as to interconnect with VCRs, DVD players, cable/satellite provider coaxial cables, etc. Physical A/V outputs 265, may be configured to transmit various A/V communication protocols with appropriate physical connections, such as to interconnect with TVs, monitors, surround sound receivers, speakers, VCRs, DVD players, etc.

The IP (network) I/O interface 280 may be configured to transmit and/or receive IP-based data (e.g., with LAN 130 and/or WAN 140 in FIG. 1 above, such as through a single connection) using a variety of different communication protocols, including, inter Is alia, TCP/IP, UDP, ATM, Video DSL, synchronous optical networks (SONET), wireless protocols, Frame Relay, Ethernet, Fiber Distributed Data Interface (FDDI), etc. The UMS 200 may be assigned a particular IP address for remote access (e.g., from LAN and/or WAN attached devices), as will be understood by those skilled in the art. In accordance with one or more embodiments described herein, IP interface 280 may be configured with one or more virtual IP-based A/V inputs 282 ("virtual inputs" as used herein, such as virtual inputs 282.4-282.N).

The memory 240 comprises a plurality of storage locations that are addressable by the processor(s) 220 (and the interfaces 205) for storing software programs and data structures associated with the embodiments described herein. The processors 220 may 25 comprise necessary elements or logic adapted to execute the software programs and manipulate the data structures, such as a virtual input list 300. An operating system 242, portions of which are typically resident in memory 240 and executed by the processor(s), functionally organizes the UMS by, inter alia, invoking operations in support of software processes and/or services executing on the server. These software processes and/or services may comprise A/V processing services 243, storage process 244, user interface process 246, IP (network) access (I/O) process/services 247, and an example virtual input configuration/management process 249 as described herein. It will be apparent to those skilled in the art that other processor and memory means, including various computer-readable media, may be used to store and execute program instructions pertaining to the inventive techniques described herein.

A/V processing services 243 contain computer executable instructions executed by processor(s) 220 to perform functions related to processing A/V signals, as will be understood by those skilled in the art. For instance, A/V input signals received from physical A/V inputs 260 may require signal processing (decoding) in order to be sent to an A/V output 265 to be properly displayed on TV 111. The A/V media may be processed for format, conversion, size, amplitude, special effects, etc., or any other purpose known to those skilled in the art.

Storage process 244 contains computer executable instructions executed by processor(s) 220 to perform functions related to storage of A/V media. For example, through the use of A/V storage 245 (e.g., internal and/or external to the UMS, such as part of memory 240, magnetic storage media, optical storage media, etc.), the UMS 200 may be configured to record A/V media generally, such as in the form of a personal video recorder (PVR) (e.g., a digital video recorder, or DVR), as will be understood by those skilled in the art. In addition, storage process 244 may be configured to respond to various recording stimuli, such as a user's manual selection to record, a timer, an A/V programming menu, etc., as well as other stimuli as described below in accordance with one or more embodiments of the present invention.

User interface process 246 contains computer executable instructions executed by processor(s) 220 to perform functions relating to user interfaces, e.g., graphical user interfaces (GUIs), such as on-screen menus, and/or physical user interfaces, such as knobs, buttons, switches, etc. Through the user interface process 246, a user may be able to configure various features of the UMS 200, as will be understood by those skilled in the art. For instance, the user interface 246 may interact with the selection display 215 to inform the user of a particular selected channel or, in particular, a selected input, such as in accordance with one or more embodiments described herein.

IP (network) access (I/O) process/service 247 contains computer executable instructions executed by processor(s) 220 to perform functions related to network communication protocols in order to transmit and receive IP-based traffic to and from other IP capable devices/nodes. Specifically, IP access process 247 processes IP data sent and received on the IP I/O interface 280. For example, in accordance with one or more embodiments described herein, on-screen menus associated with the user interface 246 may be accessed by a remote IP device via the IP I/O interface 280. The IP access process 247 may thus be used correspondingly to direct the IP data to and from the user interface 246 accordingly.

Virtual IP-Based A/V Inputs

According to embodiments of the disclosure, the UMS 200 has one or more virtual A/V inputs 282, each virtual A/V input corresponding to an IP-based A/V source device having a corresponding IP source address (or "URL", as described below) and configured to receive IP-based A/V data from the IP-based A/V source device on at least one IP input 280. Also, the UMS 200 may have at least one A/V output 265 configured to selectively output A/V data according to a selected input of the physical and virtual inputs.

In particular, UMSs (set-top boxes) may be configured as an Internet gateway for a user's house. That is, the UMS 200 may be connected to the LAN 130 as well as to the WAN 140, e.g., through IP I/O interface 280. (Note that as shown in FIG. 1, UMS 200 connects to LAN 130, which connects to WAN 140. However, as those skilled in the art will understand, the UMS may be connected to both separately.) Accordingly, the UMS 200 may be operable to send and receive IP data over the IP interface 280. Generally, then, a virtual input may be characterized herein as a configurable input that corresponds to a particular IP-based A/V media source that may be selected as though it were an independent input (e.g., such as physical inputs 260) to the UMS 200. For instance, as described herein, virtual inputs may be configured, managed, and maintained (e.g., in conjunction with virtual input configuration/management process 249) to provide an easy-to-use interface allowing users to enjoy any IP-based A/V media in a simplified manner, particularly on non-IP-based output devices (e.g., TVs 111 and speakers 112).

FIG. 3 illustrates an example virtual input list 300 in accordance with one or more embodiments described herein. Virtual input list 300 is illustratively stored in memory 240 and may include one or more entries 320, each comprising a plurality of fields for storing a virtual input identifier (ID) 305 and an associated IP address (or URL, etc.) 310 (e.g., shown with example corresponding IP-based A/V sources in parenthesis). The virtual input list 300 is illustratively maintained and managed by user interface 246 and/or virtual input configuration/management process 249. To that end, the virtual input list 300 maintains configurations of virtual IP-based A/V inputs (ID 305 and corresponding IP address 310) provided by the configurations as described herein, such as through manual user configuration or dynamic system configuration.

Virtual inputs 282 may be defined by a user using interactive menus on the UMS (e.g., set-top box) 200, such as through a remote control interface 210 or other selection means (such as a web browser on the homeowner's PC, as described herein). From this interface/menu, a user can add new virtual inputs (to list 300) to which the UMS may connect and have immediately available for viewing. In particular, to configure a virtual 20 input, an IP (network) connection is established to an IP address of a particular IP-based A/V source device (e.g., cameras 131 and 132), and that IP address is associated with the assigned virtual input (e.g., "Input 4"). The A/V media transmitted by the device at the particular IP address may then be available for viewing from the A/V output 265 (e.g., output to TV 111), simply by selecting a different "input" (e.g., "Input 4") in a manner that will be appreciated by those skilled in the art (that is, by anyone with an "input" button on their TV, remote, set-top box, etc.). In this manner, a TV may be used as a universal output device to view and hear a plurality of IP-based A/V sources, both local to the UMS (from LAN 130) and remote (from WAN 140). For example, IP-based video cameras placed around the house may be viewed from any appropriately equipped TV 111 by simply selecting a virtual input (e.g., by simply pressing an input button on the remote control 116).

Other example IP-based A/V media sources may comprise on-site video surveillance cameras, audio (e.g., MP3) streaming sources, remote webcams, internet radio stations, video conferencing UMSs (described below), etc. Through management of the virtual inputs (list 300), various IP-based A/V media sources may be assigned to different virtual inputs (e.g., 4-N) for selectable output to an A/V output device (e.g., TV 111, speakers 112, etc.).

In addition to local access, the UMS 200 may have at least one IP output 280 configured to selectively output IP data corresponding to the A/V data from the physical and virtual inputs. That is, the IP output 280 may be addressable by a particular IP address, which may be accessed by one or more IP-based receiver devices. For instance, example IP-based receiver devices are PCs, wireless handheld computing devices (e.g., personal digital assistants, "PDAs"), IP-capable televisions (e.g., other UMSs 200), and IP-capable phones (e.g., smartphones).

By accessing the IP output 280 (e.g., by pointing a web browser to the UMS 200), local and remote users may correspondingly access the A/V data received on the physical and virtual inputs of the UMS. Illustratively, user interface process 246 may provide one or more interactive menus that allow an IP-based user (device) to select from one or more options, such as to create virtual inputs (as above) and/or to view A/V data from a particular input. Various policies and safeguards may be configured on the UMS in order to protect privacy, such as "username" and "password" protection, as well as access policies. For example, it may be advantageous to limit remote access to certain inputs, such as those external to the house, in order to prevent remote users from potentially breaching security measures to view any internal A/V feeds through the UMS 200. In this manner, only a user local to the UMS (e.g., inside the house) is allowed to access A/V media for virtual inputs that correspond to internal IP-based A/V media sources.

Particularly well-suited for security/surveillance, the remote access of virtual IP-based A/V inputs provided by one or more embodiments described herein allows a user traveling away from his/her home to view the surveillance video captured on one or more virtual inputs, e.g., as described below.

Further, the UMS 200 may be configured with an internal recording mechanism, such as storage process 244 and A/V storage 245 (e.g., as a personal video recorder, PVR), or an external recording mechanism may be attached to the UMS 200, such as a VCR 113 or other device. Accordingly, the A/V media/data received on the virtual inputs 282 may be recorded in a manner similar to conventional physical A/V input media/data. For example, rather than selecting a physical input 260 (e.g., cable/satellite provider 115), one or more embodiments described herein allows a user to select a virtual input 282 to be recorded. By providing an additional option from the user interface 246, the user can select a particular time and duration for recording, and optionally a length of time to retain the recorded/stored A/V media. By recording the A/V media, particularly that of the virtual inputs 282, local or remote access of the UMS 200 may provide both live and recorded A/V media. (Recorded media, in particular, may be rewound and fast-forwarded advantageously.)

Beyond conventional recording time and duration, storage process 244 may also be configured to record A/V data based on one or more stimuli. For example, configurable timers and manual selection may be considered to be stimuli, but additionally, motion detection and sound detection may also be used to trigger the recording of A/V media. For example, as described below, for use with video surveillance, recording video motion only may help to preserve storage space as compared to recording hours of unchanging imagery. That is, rather than record all day, every day, and watching the entire length of recorded video for any relevant activity, the storage process 244 may be configured to record the ten minutes of video motion where someone (or thing) passed near a camera (e.g., detected by a motion sensor, not shown) or through the camera's field of vision, as will be understood by those skilled in the art.

Figure 4A:
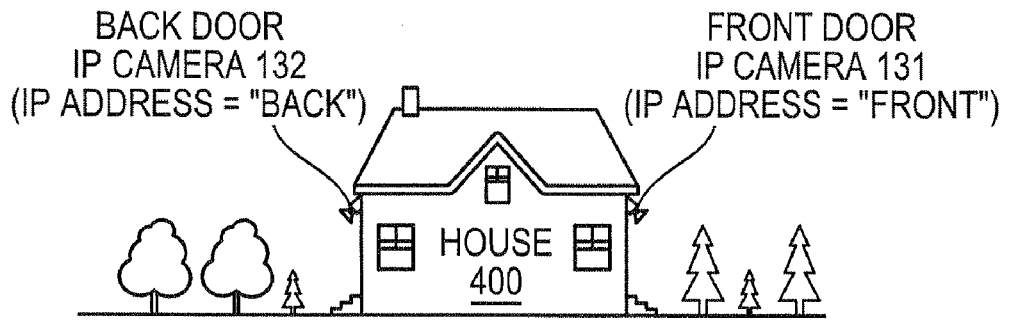
FIGS. 4A-7 illustrate example uses of virtual IP-based A/V inputs in accordance with one or more embodiments described herein.

FIGS. 4A-7 illustrate example uses of virtual IP-based A/V inputs in accordance with one or more embodiments described herein. In particular, FIGS. 4A-4B illustrate an example use for home security applications as mentioned above. For instance, the availability of IP-based cameras (e.g., wired and wireless) may allow for readily accessible home security and video surveillance for the average consumer. Illustratively, a user may connect IP-based cameras to various locations around (and in) the house 400, such as, e.g., a wired camera 131 at the front door to the house and a wireless camera 132 at the back door to the house. The front door IP-based camera 131 is associated with a particular IP address for the house's local LAN 130, for example, denoted as "Front", while the back door IP-based camera 132 is associated with a different IP address, for example, denoted as "Back".

Notably, those skilled in the art will appreciate that while terms such as "Front" and "Back" are used, such terms are merely representative of actual IP addresses, such as IPv4 and/or IPv6 address formats, and are not meant to be taken literally. For example, the term "Front" may represent a local network (LAN) address corresponding to "192.168.0.3" while "Back" may represent a local network (LAN) address corresponding to "192.168.0.4". At the same time, however, through the use of network address translation (NAT) services, universal resource locators (URLs) may be used in place of IP addresses, where a NAT server within the network is configured to translate the URL from its word-form to IP address form (e.g., from "www.cisco.com" to "198.133.219.25"). As used herein, therefore, the terms used to describe IP addresses may represent any IP address that is reachable by IP-based receiver devices, as will be understood by those skilled in the art.

Once the IP-based cameras are connected to the LAN 130, the UMS 200 may be configured with virtual IP-based A/V inputs 282 for each of the cameras, e.g., two virtual inputs ("Input 4" and "Input 5") each corresponding to one of the two example cameras (Front 131 and Back 132, respectively). By selecting between Input 4 and Input 5 on the UMS 200, the user is able to view live surveillance camera feeds for the front and back door of the house 400 from any TV/monitor 111 so configured within the house. For example, if the front doorbell rings while the user is watching television programming, simply selecting Input 4 on the UMS 200 allows the user to view the A/V data input from the front door camera 131 accordingly.

In addition, through the use of remote access through the UMS 200, the user may also monitor the images from the cameras 131 and 132 while away from the house 400. For instance, while away on vacation, a user may wish to view the video from the front door camera 131, e.g., in response to receiving an alarm (e.g., automated). By using a remote PC or smartphone 143 (or other IP-based receiver device), the user may access the UMS 200 as described above, and view the live video feed from a selected virtual input (e.g. Input 4 or 5).

In the event the UMS 200 is configured to store A/V data, the user may also locally or remotely access A/V data stored in the past (e.g., to view who or what stole the user's backyard lawn ornaments). For example, the user may wish to view video stored from Input 5 (the back door), such as any stored material when motion was detected in the past 5 days. If the user returns home after being away, the user may simply use the UMS to locate the stored video, and scan through the video (fast forward, rewind, etc.) on the TV 111 to search for anything of interest. If the user is still away from the house but has access to the UMS 200 remotely, such as through a smartphone 143, the user may access the stored video as described above.

Figure 4B:
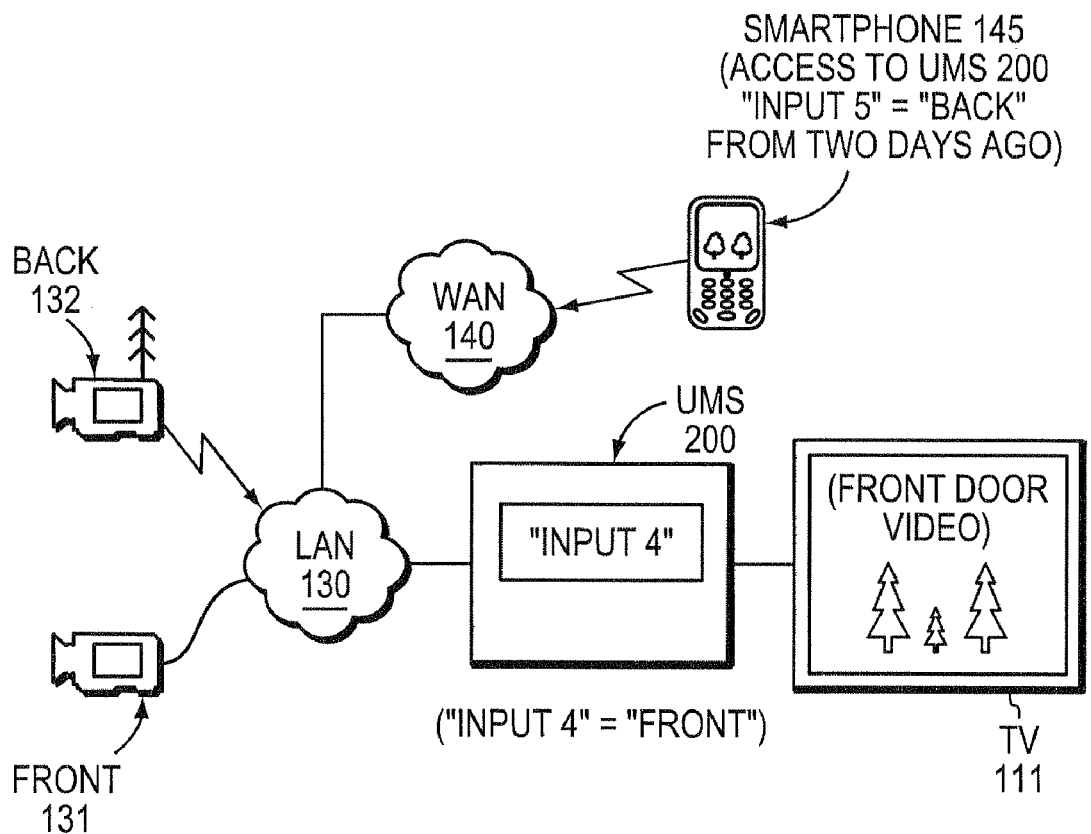

In the manner described for FIGS. 4A and 4B, conventional video surveillance is extended beyond expensive/complicated IP-only systems or analog-only systems. That is, embodiments described herein provide a simplified surveillance system that the average consumer with knowledge of traditional television/set-top box "input" selection and IP-camera installation can operate locally or remotely (with knowledge of web-browsing). In particular, average consumers with knowledge of PVRs are able to view surveillance video of their homes as easily as they can navigate the conventional PVR menu, with the addition of one or more virtual inputs.

Figure 5:
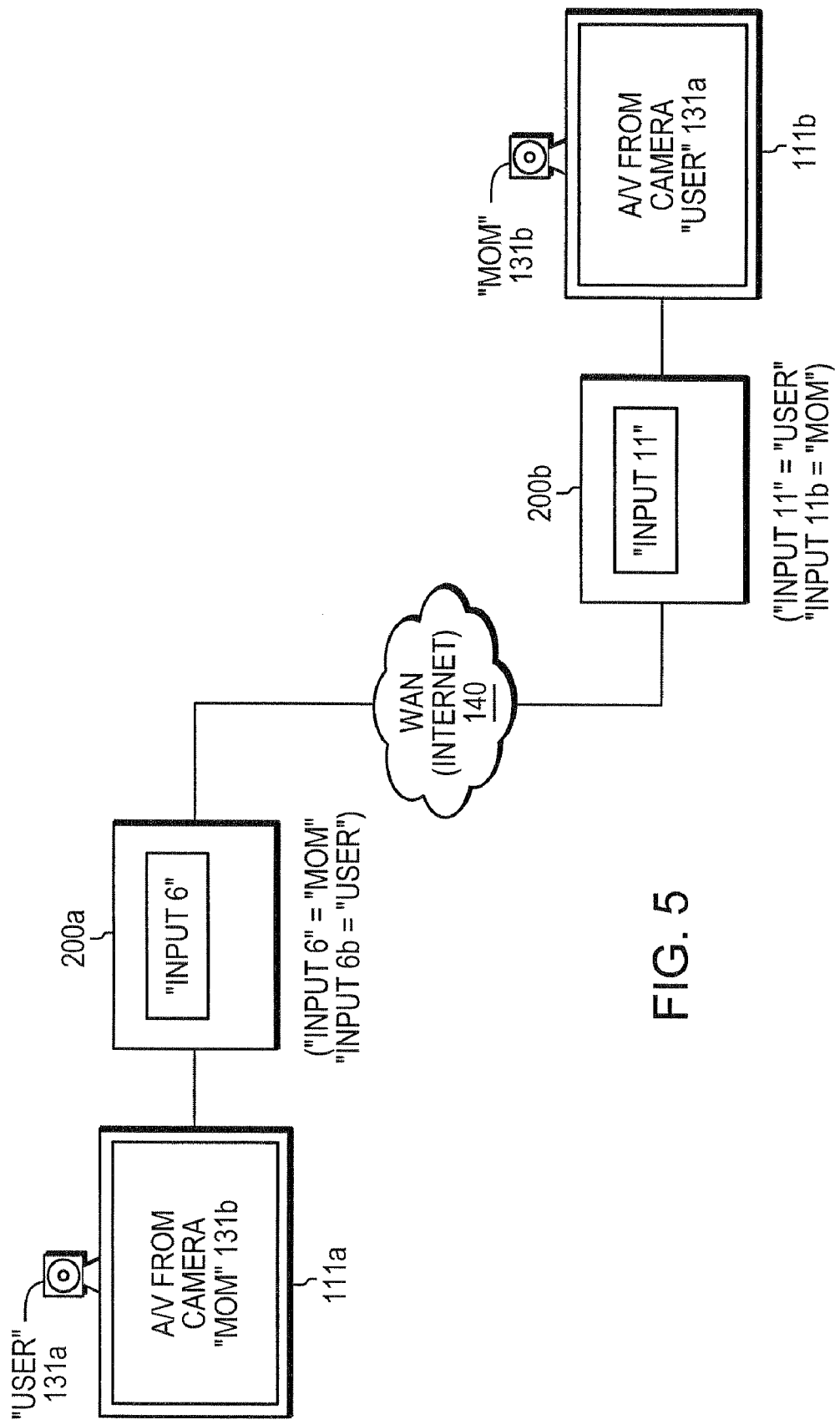

FIG. 5 illustrates another example use of virtual IP-based A/V inputs in accordance with one or more embodiments described herein. For instance, a simple video/audio conference system may be established using two similar UMS 200 setups as described. That is, a user may configure a UMS 200*a* that is interconnected to a TV 111*a* and a camera 131*a*, and may connect the IP I/O interface 280 to a WAN 140. As described above, the camera 131*a* may have a particular IP address (e.g., "User"), as well as a particular virtual input on the UMS 200a (e.g., "Input 6*a*"). In addition, a second user (e.g., "mom") may have a similar configuration with a UMS 200*b*, TV 111*b*, and a camera 131*b* configured as a virtual input "Input 11*b*" on the UMS 200*b*. Each of the UMSs 200 may be interconnected to the WAN 140 (e.g., the Internet).

To establish a simple video conference system, the user may configure one of its UMS's virtual IP-based A/V inputs 282 (e.g., "Input 6") to correspond to "mom's" IP-based camera 131*b*. Illustratively, the configuration may correspond directly to the IP-address of the camera 131*b* (e.g., "Mom"), or to Input 11*b* of mom's UMS 200*b*. (That is, the camera 131*b* may be accessed directly through the WAN 140 without traversing the UMS 200*b*, or by specifically indicating the virtual input "Input 11*b*" of the UMS 200*b*.) In this manner, when mom's camera 131*b* is on (e.g., any time or at pre-arranged times), the user may remotely access the A/V feed from that camera by simply selecting Input 6 on the UMS 200*a*. The A/V media (image and/or sound) from mom's camera may then appear on the TV 111*a*. Mom may do the same to view the user through converse configuration on her UMS 200*b* to view the user's camera 131*a* on her "Input 11". Accordingly, mom need not concern herself with computers, the Internet, or video conferencing programs, but may now simply use her UMS (e.g., set-top box) 200 remote control 116 to select Input 11 to view the user (e.g., her child) on her TV 111*b*.

Figure 6:
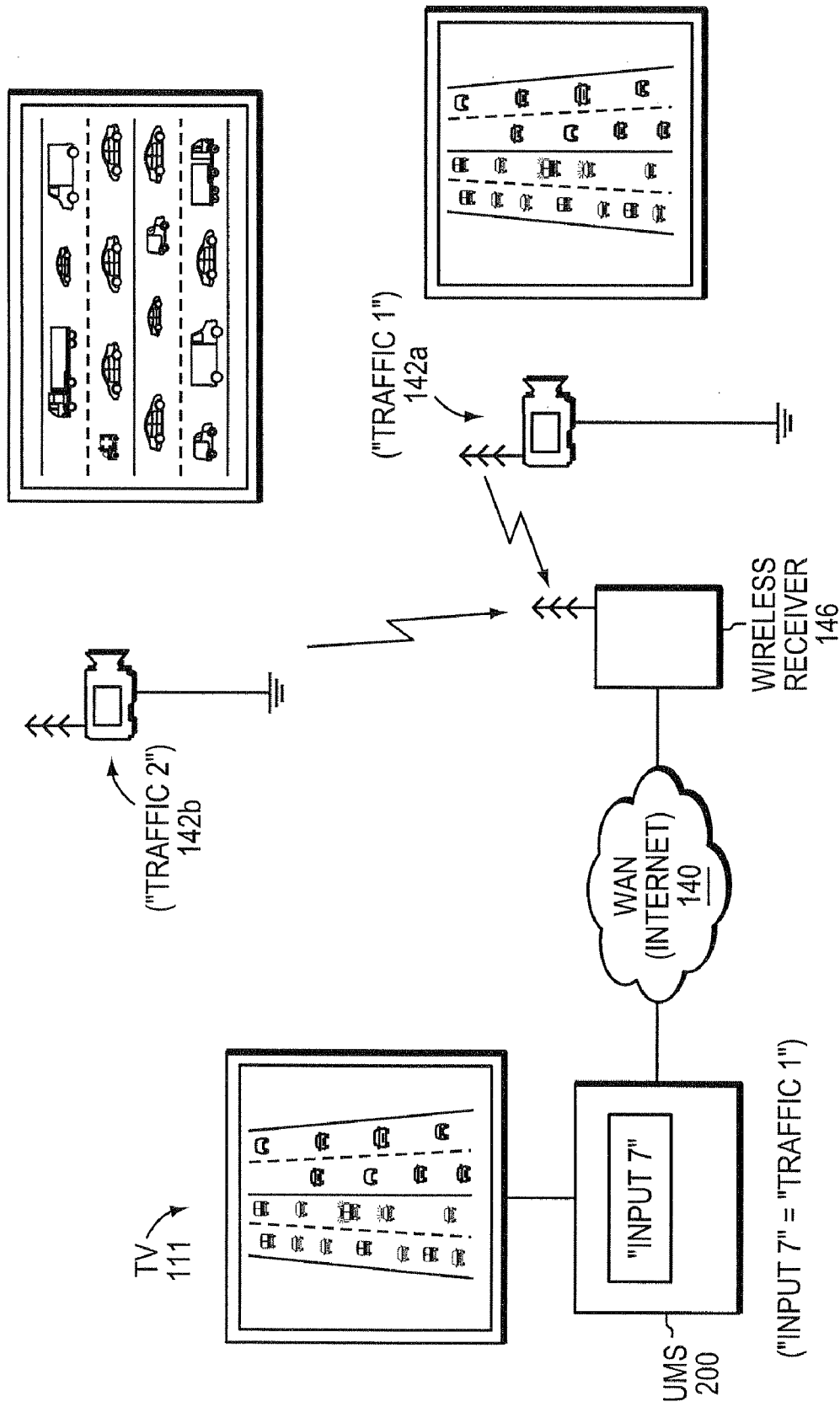

FIG. 6 illustrates another example use of virtual IP-based A/V inputs in accordance with one or more embodiments described herein. For instance, one or more IP-based cameras 142 (e.g., 142*a* at IP address "Traffic 1" and 142*b* at IP address "Traffic 2") may be located near particular points of interest of a city's traffic-ridden commuted highways. Illustratively, the cameras 142 are wirelessly connected to a wireless receiver 146, which in turn transmits the cameras' video onto the WAN 140 (e.g., the Internet). Notably, the video transmission between the cameras and the wireless receiver need not be IP-based, but instead the receiver 146 may convert the received wireless signals from each camera 142 into IP-based A/V media, where the media from each camera has a particular corresponding IP address.

The UMS 200 may be configured with the IP addresses corresponding to each camera (or, as mentioned, each camera's corresponding A/V media's IP address), such as, e.g., "Input 7" and "Input 8" for cameras 142*a* (Traffic 1) and 142*b* (Traffic 2), respectively. In this manner, a user of the UMS 200 having virtual inputs established accordingly is able to simply select Input 7 or Input 8 to view traffic points of interest. That is, rather than logging onto a traffic website and locating the proper camera feeds, or waiting for the local news stations to display the camera images during the morning news, a user (an interested commuter) may simply select "Input 7" on the UMS 200 to view the live video images from camera 142*a* to determine whether to seek an alternate route (or take a long breakfast).

Figure 7:
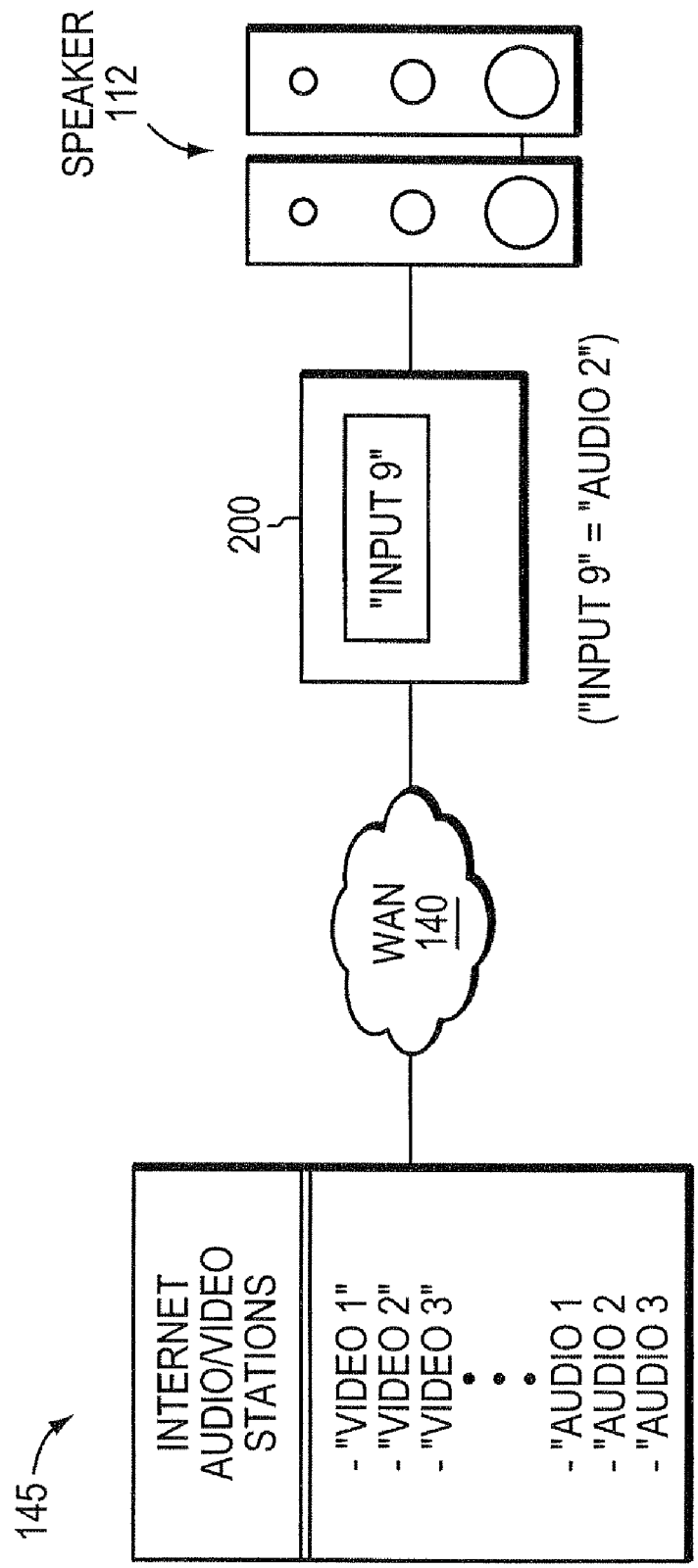

FIG. 7 illustrates another example use of virtual IP-based A/V inputs in accordance with one or more embodiments described herein. For instance, one or more A/V source servers 145, such as IP radio stations, IP video stations, etc., may provide (broadcast or source) video and or audio streams onto the Internet (WAN 140), as will be understood by those skilled in the art. For example, video stations may transmit on IP addresses corresponding to "Video 1-3" and audio stations may transmit on IP addresses corresponding to "Audio 1-3". Prior configuration of a virtual IP-based A/V input (e.g., "Input 9") may be established to correspond to IP address "Audio 2", and the UMS 200 may receive the broadcast/sourced A/V stream (e.g., for at least IP address Audio 2) on IP I/O interface 280. In this manner, by simply selecting "Input 9" on the UMS 200, the corresponding A/V output (265) may receive the A/V media (e.g., an audio stream to speakers 112). A similar arrangement may be made for video streams, such that one or more virtual inputs may correspond to one or more IP-based A/V sources (e.g., with video output to a TV/monitor 111).

In addition to the stimuli discussed above for recording, the storage process 244 may also be configured to record based on a selection of particular programming times. For instance, similar to conventional program listings of set-top boxes, a user may configure recording of a particular IP-based program (or a particular time), such that the program on that virtual input (e.g., audio from Input 9) is recorded to A/V storage 245.

Notably, the examples described above (e.g., FIGS. 4A-7) are merely illustrative, and are not meant to be limiting to the applicability of the virtual IP-based A/V inputs in accordance with one or more embodiments described herein. In other words, any IP-based A/V source may be received at the IP input 280 of the UMS 200, and such sources (e.g., the IP addresses corresponding to those sources) may be configured as one of the virtual inputs. In this manner, a user may simply select the configured virtual input in order to access the A/V media sourced from that IP address. Also, as described above, the virtual input access may be made locally at the UMS 200 and TV/monitor 111 (and/or speakers 112), or remotely through an authorized IP device, such as PCs and/or smartphones. That is, by accessing the IP output 280 (e.g., the IP address of the UMS 200 having the configured virtual inputs 282), a remote access device may access the virtual inputs in a similarly simple manner (e.g., selecting the virtual inputs of the UMS 200 to display on the remote device, particularly A/V source devices local to the UMS's LAN 130).

Figure 8:
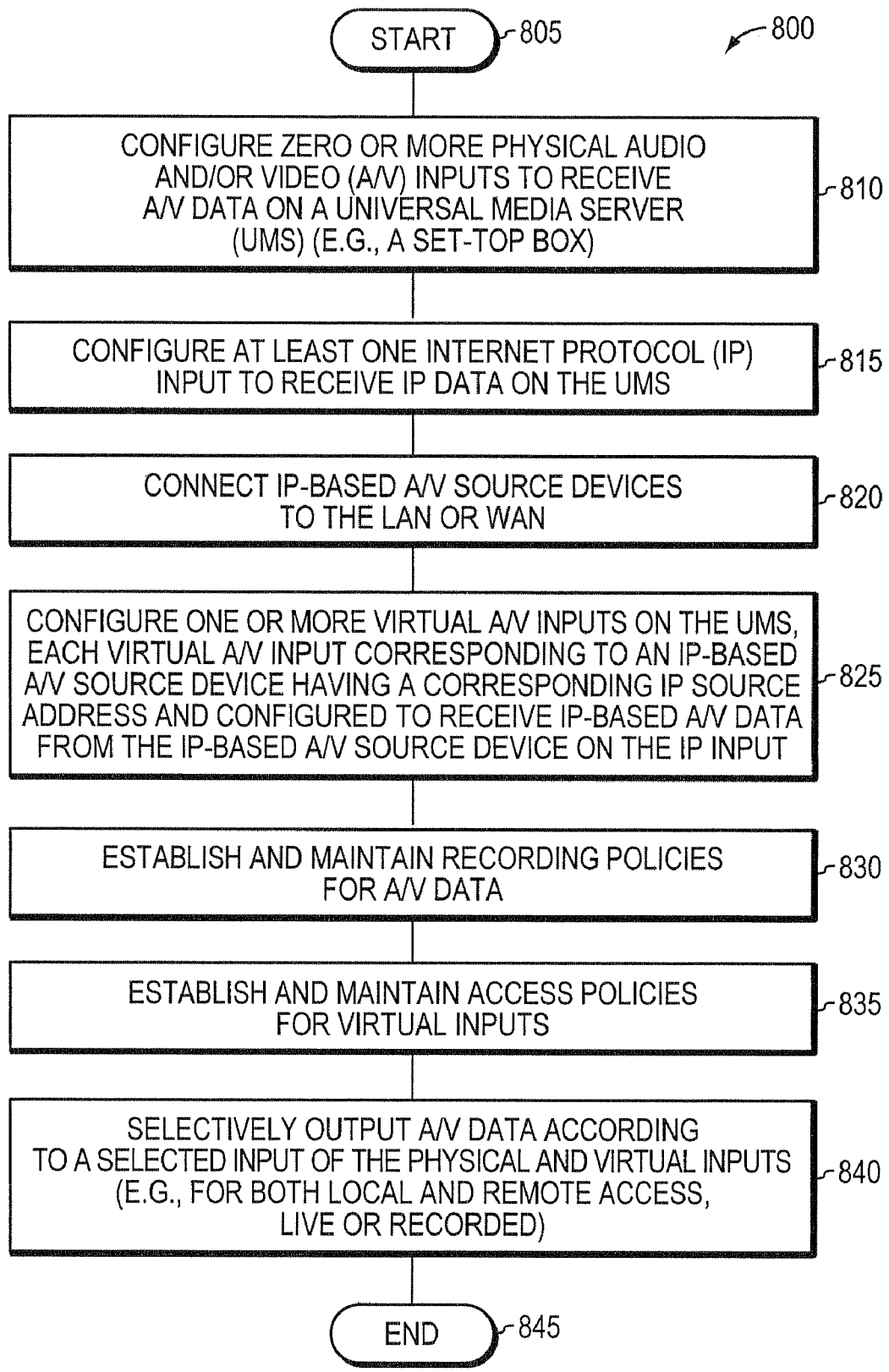
FIG. 8 illustrates an example procedure for providing for and using virtual IP-based A/V inputs in accordance with one or more embodiments described herein.

FIG. 8 illustrates an example procedure for providing for and using virtual IP-based A/V inputs in accordance with one or more embodiments described herein. The procedure 800 starts at step 805, and continues to step 810, where zero or more physical A/V inputs 260 are configured to receive A/V data on a UMS 200, e.g., a set-top box, and to step 815 where at least one IP input 280 is configured to receive IP data on the UMS. In step 820, one or more IP-based A/V source devices (having a corresponding IP source address) may be connected to the LAN 130 and/or WAN 140, such as cameras (131, 132, 141, 142), other A/V sources 145, etc. On the UMS, one or more virtual A/V inputs 282 may be configured in step 825 that correspond to an IP-based A/V source device. Each virtual input may thus be configured to receive IP-based A/V data from the corresponding IP-based A/V source device on the IP input 280. Various recording policies for A/V data (from virtual and/or physical inputs) may be established and maintained in step 830, as described above. Also as described above, access policies may be established and maintained in step 835, such as to limit access to certain inputs from remote access devices, etc. In step 840, A/V data may be selectively output according to a selected input of the physical and virtual inputs (e.g., for both local and remote access, live or recorded). The procedure 800 ends in step 845, that is, with configured inputs and selectivity of those inputs for one or more outputs as described herein.

Advantageously, the novel techniques described herein provide for virtual IP-based A/V inputs for a UMS and novel uses thereof. By defining and configuring virtual IP-bases A/V inputs, particularly using a simplified user interface (e.g., on set-top boxes), the novel techniques allow for a new wave of connectivity between IP-based A/V sources and conventional home A/V equipment (e.g., readily available to today's A/V users). In particular, the techniques described above provide for an easily connected and configured IP-based A/V system, both live and recorded, that may be accessed locally (e.g., in the home) and/or remotely (e.g., on the road). For example, user-friendly (and comparatively non-complex and possibly inexpensive) security solutions are provided that reduce/alleviate certain problems currently faced with security systems. Moreover, the embodiments described herein leverage set-top boxes, TVs, PCs, mobile wireless hand-held devices, IP cameras, PVRs/DVRs (personal/digital video recorders), remote controls, etc., in a simplified manner that is intuitive to the average consumer of A/V products available today.

In other words, by unifying all of the capabilities described herein, the UMS has the ability to receive, transmit, view, store, and review A/V data from a substantial array of IP sources while offering access to users via the TV, a PC, or wireless handheld device while in the house or away traveling.

While there have been shown and described illustrative embodiments that provide for virtual IP-based A/V inputs for a UMS and novel uses thereof, it is to be understood that various other adaptations and modifications may be made within the spirit and scope of the present invention. For example, the embodiments have been shown and described herein showing particular example uses of the virtual IP-based A/V inputs. However, the embodiments of the invention in their broader sense are not so limited, and may, in fact, be applicable to other uses not specifically mentioned herein, and such uses remain within the scope and spirit of the embodiments described herein. Further, while the above description relates a UMS to a set-top box as understood by those skilled in the art, it should be noted that the UMS 200 may be a dedicated unit configured to operate in conjunction with virtual IP-based A/V inputs in a manner as described above, without providing additional support for cable/satellite/etc. as would a traditional set-top box.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

The invention claimed is:

1. A universal media server, comprising:
   zero or more physical audio and/or video (A/V) inputs configured to receive A/V data;
   at least one Internet Protocol (IP) input configured to receive IP data;
   one or more virtual A/V inputs, each particular virtual A/V input corresponding to a particular IP-based A/V source device having a corresponding IP source address and configured to receive IP-based A/V data from the particular IP-based A/V source device on the at least one IP input; and
   at least one A/V output configured to selectively output A/V data according to a selected input of the physical and virtual inputs, wherein selection of a particular virtual A/V input for the A/V output results in an output from the universal media server of A/V data sourced from the particular IP-based A/V source device corresponding to the particular selected virtual A/V input.

2. The universal media server as in claim 1, wherein the universal media server is a set-top box.

3. The universal media server as in claim 1, wherein the zero or more physical A/V inputs are connectable to a device selected from the group consisting of: magnetic media devices; optical media devices; cable television; antenna television; and satellite media receiver devices.

4. The universal media server as in claim 1, wherein the one or more virtual A/V inputs receive IP-based A/V data from sources selected from the group consisting of: IP-based cameras; IP-based streaming audio sources; IP-based streaming video sources; and IP-based microphones.

5. The universal media server as in claim 4, wherein the IP-based A/V data sources are configured to provide services selected from the group consisting of: video conferences; phone conferences; IP radio stations; IP video stations; video surveillance; and audio surveillance.

6. The universal media server as in claim 4, wherein the IP-based A/V data sources are either wired or wireless IP sources.

7. The universal media server as in claim 1, further comprising:
   at least one recording device configured to record A/V data received on the one or more virtual A/V inputs.

8. The universal media server as in claim 7, wherein the recording device is configured to record A/V data based on one or more stimuli.

9. The universal media server as in claim 8, wherein the stimuli are selected from the group consisting of: configurable timers; manual selection; motion detection; sound detection; and selection of particular programming times.

10. The universal media server as in claim 1, wherein the particular virtual A/V input is configured to correspond to a particular universal resource locator (URL) that references the particular IP address.

11. The universal media server as in claim 1, further comprising:
    at least one IP output configured to selectively output IP data corresponding to the A/V data from the physical and virtual inputs.

12. The universal media server as in claim 11, wherein the IP output is addressable by an IP address.

13. The universal media server as in claim 12, wherein the A/V data output by the IP output is accessible to P-based receiver devices.

14. The universal media server as in claim 13, wherein the IP-based receiver devices are selected from the group consisting of: personal computers (PCs); wireless handheld computing devices; IP-capable televisions; and P-capable phones.

15. The universal media server as in claim 1, wherein the at least one IP input is configured to receive wired IP-based A/V inputs.

16. The universal media server as in claim 1, wherein the at least one IP input is configured to receive wireless IP-based A/V inputs.

17. The universal media server as in claim 1, wherein the A/V output is configured to output A/V data to a television.

18. A method, comprising:
    configuring zero or more physical audio and/or video (A/V) inputs to receive A/V data on a universal media server (UMS);
    configuring at least one Internet Protocol (IP) input to receive IP data on the UMS;
    configuring one or more virtual A/V inputs on the UMS, each particular virtual A/V input corresponding to a particular IP-based A/V source device having a corresponding IP source address and configured to receive IP-based A/V data from the particular IP-based A/V source device on the IP input; and selectively outputting A/V data according to a selected input of the physical and virtual inputs, wherein selection of a particular virtual A/V input results in outputting A/V data sourced from the particular IP-based A/V source device corresponding to the particular selected virtual A/V input.

19. The method as in claim 18, wherein the UMS is a set-top box.

20. The method as in claim 18, further comprising:
receiving, on the one or more virtual A/V inputs, IP-based A/V data from sources selected from the group consisting of: IP-based cameras; IP-based streaming audio sources; IP-based streaming video sources; and IP-based microphones.

21. The method as in claim 18, further comprising:
recording A/V data received on the one or more virtual A/V inputs on the UMS.

22. The method as in claim 21, further comprising:
determining the occurrence of one or more stimuli; and in response,
recording the A/V data received on the one or more virtual A/V inputs.

23. The method as in claim 18, wherein the particular virtual A/V input is configured to correspond to a particular universal resource locator (URL) that references the particular IP address.

24. The method as in claim 18, further comprising:
selectively outputting IP data corresponding to the A/V data from the physical and virtual inputs to at least one IP output of the UMS.

25. Software encoded in one or more tangible computer-readable media and when executed operable to:
receive Internet Protocol (IP) data on an IP input of a universal media server (UMS);
configure one or more virtual audio and/or video (A/V) inputs to receive A/V data on the UMS, each virtual A/V input corresponding to an IP-based A/V source device having a corresponding IP source address and configured to receive IP-based A/V data from the IP-based A/V source device on the IP input; and
selectively output A/V data according to a selected input of the virtual inputs and zero or more physical A/V inputs of the UMS, wherein selection of a particular virtual A/V input results in an output from the UMS of A/V data sourced from the particular IP-based A/V source device corresponding to the particular selected virtual A/V input.

* * * * *

UNITED STATES PATENT AND TRADEMARK OFFICE
CERTIFICATE OF CORRECTION

PATENT NO. : 7,668,120 B2  Page 1 of 1
APPLICATION NO. : 11/671805
DATED : February 23, 2010
INVENTOR(S) : Mark A. Kolar It is certified that error appears in the above-identified patent and that said Letters Patent is hereby corrected as shown below:

Col. 4, Line 17, please amend as shown:

tocols, including, inter[[ Is]] alia, TCP/IP, UDP, ATM, Video

Col. 4, Line 31, please amend as shown:

cessors 220 may[[ 25]] comprise necessary elements or logic

Col. 6, Line 12, please amend as shown:

configure a virtual[[ 20]] input, an IP (network) connection is

Col. 12, Line 44, please amend as shown:

A/V data output by the IP output is accessible to[[ P-based]] IP-based

Col. 12, Line 49, please amend as shown:

puting devices; IP-capable televisions; and[[ P-capable]] IP-capable phones.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO.       : 7,668,120 B2                                           Page 1 of 1
APPLICATION NO. : 11/671805
DATED            : February 23, 2010
INVENTOR(S)      : Mark A. Kolar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Twenty-eighth Day of December, 2010

David J. Kappos
*Director of the United States Patent and Trademark Office*